(12) United States Patent
Shimoguchi

(10) Patent No.: US 7,796,859 B2
(45) Date of Patent: Sep. 14, 2010

(54) DVD REPRODUCING APPARATUS

(75) Inventor: Tadashi Shimoguchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1043 days.

(21) Appl. No.: 11/352,309

(22) Filed: Feb. 13, 2006

(65) Prior Publication Data

US 2006/0182419 A1    Aug. 17, 2006

(30) Foreign Application Priority Data

Feb. 15, 2005    (JP) ................ P2005-037123

(51) Int. Cl.
- *H04N 5/91* (2006.01)
- *H04N 7/00* (2006.01)
- *H04N 7/26* (2006.01)
- *H04N 5/00* (2006.01)

(52) U.S. Cl. .............. 386/68; 386/46; 386/82; 386/124; 386/125; 386/126

(58) Field of Classification Search ........ 386/1, 386/46, 52, 68, 82, 95, 124–126
See application file for complete search history.

(56) References Cited

U.S. PATENT DOCUMENTS 6,434,097 B1 * 8/2002 Lewis et al. ............. 369/47.11
7,231,129 B2 * 6/2007 Miyashita et al. ............ 386/46
7,493,018 B2 * 2/2009 Kim ........................... 386/69

FOREIGN PATENT DOCUMENTS

JP        2004-213729        7/2004

* cited by examiner

*Primary Examiner*—Thai Tran
*Assistant Examiner*—Marc Dazenski
(74) *Attorney, Agent, or Firm*—Morgan, Lewis & Bockius LLP

(57) ABSTRACT

A DVD reproducing apparatus having an A-B repeat function of repeating reproduction between point A set on a VOBU of plural VOBUs and point B set on a VOBU behind the point A, includes an NV_PCK storage unit that stores an address data stored in an NV_PCK of the VOBU where the point A and the point B are set, a judgment unit that judges whether or not a V_PCK is included in the VOBU where the point A is set, an acquisition unit that acquires an address data of a nearest VOBU before the VOBU where the point A is set and having a V_PCK if the judgment unit judges that a V_PCK is not included in the VOBU where the point A is set, and a reproduction unit that reproduces an image of a VOBU based on an address data acquired by the acquisition unit.

4 Claims, 10 Drawing Sheets

DVD REPRODUCING APPARATUS

BACKGROUND OF THE INVENTION

1. Field of the Invention

The present invention relates to a DVD reproducing apparatus.

2. Description of the Related Art

Recently, there is an increasing demand for the DVD (Digital Versatile Disc) reproducing apparatus. This DVD reproducing apparatus is provided with various reproduction functions, among which an A-B repeat function of repeatedly reproducing sound between A and B by deciding point A and point B during reproduction is well known.

DVD data includes a great number of pieces of data called a VOBU (Video Object Unit). Also, the VOBU includes NV_PCK storing the address data of each data included in the VOBU, and plural image audio data stored after the NV_PCK and includes V_PCK of video data, A_PCK of audio data and SP_PCK of sub-picture data. And if the user sets point A and point B during reproduction of DVD, the address data of V_PCK and so on corresponding to respective positions at which point A and point B are set are extracted from the NV_PCK and stored, repeating the reproduction from the position where point A is set to the position where point B is set (See, for example, JP-A-2004-213729).

By the way, in the DVD of a slide show such as a so-called music video clip, there are many VOBUs without V_PCK, and in such a VOBU, the image of the nearest VOBU before the VOBU and having V_PCK is displayed. For example, in a case where point A is set in the VOBU without V_PCK, and point B is set in the VOBU with V_PCK, when the reproduction is ended at point B and returns to point A, the image at point B is directly displayed, because there is no V_PCK in the VOBU where point A is set. Therefore, though the image of the nearest VOBU before the VOBU where point A is set and having V_PCK should be essentially displayed at point A, the image at point B is directly displayed, giving the user a feeling of physical disorder.

It is an object of the invention to provide a DVD reproducing apparatus that can accurately display an image at a specified reproduction position.

SUMMARY OF THE INVENTION

According to a first aspect of the present invention, a DVD reproducing apparatus having an A-B repeat function of repeating reproduction between point A set on a VOBU of plural VOBUs and point B set on a VOBU behind the point A, includes an NV_PCK storage unit that stores an address data stored in an NV_PCK of the VOBU where the point A and the point B are set, a judgment unit that judges whether or not a V_PCK is included in the VOBU where the point A is set when the point A is set, an acquisition unit that acquires an address data of a nearest VOBU before the VOBU where the point A is set and having a V_PCK if the judgment unit judges that a V_PCK is not included in the VOBU where the point A is set, a V_PCK storage unit that stores the address data acquired by the acquisition unit, and a reproduction unit that reproduces an image based on an address data of the VOBU having a V_PCK stored in the V_PCK storage unit when a reproduction occurs up to the point B and returns to the point A.

According to a second aspect of the present invention, a DVD reproducing apparatus having a marker search function of starting reproduction from a marker point set on a VOBU of plural VOBUs, includes an NV_PCK storage unit that stores an address data stored in NV_PCK of the VOBU where the marker point is set, a judgment unit that judges whether or not a V_PCK is included in the VOBU where the marker point is set, an acquisition unit that acquires an address data of a nearest VOBU before the VOBU where the marker point is set and having a V_PCK if the judgment unit judges that a V_PCK is not included in the VOBU where the marker point is set, a V_PCK storage unit that stores the address data acquired by the acquisition unit, and a reproduction unit that reproduces an image based on an address data of the VOBU having a V_PCK stored in the V_PCK storage unit when a reproduction returns to the marker point during reproduction of the image.

According to a third aspect of the present invention, a DVD reproducing apparatus having an A-B repeat function of repeating reproduction between point A set on a VOBU of plural VOBUs and point B set on a VOBU behind the point A, includes an NV_PCK storage unit that stores an address data stored in an NV_PCK of the VOBU where the point A and the point B are set, a judgment unit that judges whether or not a V_PCK is included in the VOBU where the point A is set, an acquisition unit that acquires an address data of a nearest VOBU before the VOBU where the point A is set and having a V_PCK if the judgment unit judges that a V_PCK is not included in the VOBU where the point A is set, and a reproduction unit that reproduces an image of a VOBU based on an address data acquired by the acquisition unit.

According to a fourth aspect of the present invention, a DVD reproducing apparatus having an A-B repeat function of repeating reproduction between point A and point B that are set, includes an NV_PCK storage unit that stores an address data stored in an NV_PCK of a VOBU where the point A and the point B are set, a judgment unit that judges whether or not a V_PCK is included in the VOBU where the point A is set when a reproduction occurs up to the point B and returns to the point A, an acquisition unit that acquires an address data of nearest VOBU before the VOBU where the point A is set and having a V_PCK if the judgment unit judges that a V_PCK is not included in the VOBU where the point A is set, and a reproduction unit that reproduces an image of a VOBU based on an address data acquired by the acquisition unit.

With the invention of the first aspect, in a DVD reproducing apparatus having an A-B repeat function, NV_PCK storage means stores the address data stored in NV_PCK of the VOBU where the point A and the point B are set, judgment means judges whether or not V_PCK is included in the VOBU where the point A is set, when the point A is set, acquisition means acquires the address data of nearest VOBU before the VOBU where the point A is set and having V_PCK, if the judgment means judges that V_PCK is not included in the VOBU where the point A is set, V_PCK storage means stores the address data acquired by the acquisition means, and reproduction means reproduces an image based on the address data of the VOBU having V_PCK stored in the V_PCK storage means, when the reproduction occurs up to the point B and returns to the point A, whereby even if the V_PCK is not included in the VOBU where the point A is set, the image based on the address data acquired by the acquisition means and stored by the V_PCK storage means of nearest VOBU before the VOBU where the point A is set and having V_PCK can be reproduced by the reproduction means, and in the A-B repeat reproduction, the image to be displayed at the point A can be accurately reproduced, even if there is no image data at the point A.

Particularly, since the address data of nearest VOBU before the VOBU where the point A is set and having V_PCK is already stored in the V_PCK storage means, even if the V_PCK is not included in the VOBU where the POINT A is set, the image based on the address data can be reproduced promptly when the reproduction returns from point B to point A.

With the invention of the second aspect, in a DVD reproducing apparatus having a marker search function, NV_PCK storage means stores the address data stored in NV_PCK of the VOBU where the marker point is set, judgment means judges whether or not V_PCK is included in the VOBU where the marker point is set, acquisition means acquires the address data of nearest VOBU before the VOBU where the marker point is set and having V_PCK, if the judgment means judges that V_PCK is not included in the VOBU where the marker point is set, V_PCK storage means stores the address data acquired by the acquisition means, and reproduction means reproduces an image based on the address data of the VOBU having V_PCK stored in the V_PCK storage means, when the reproduction returns to the marker point during reproduction of the image, whereby the image based on the address data acquired by the acquisition means of nearest VOBU before the VOBU where the marker point is set and having V_PCK can be reproduced by the reproduction means, even if the V_PCK is not included in the VOBU where the marker point is set, and in the reproduction of the marker search function, the image to be displayed at the marker point can be accurately reproduced, even if there is no image data at the marker point.

With the invention of the third aspect, in a DVD reproducing apparatus having an A-B repeat function, NV_PCK storage means stores the address data stored in NV_PCK of the VOBU where the point A and the point B are set, judgment means judges whether or not V_PCK is included in the VOBU where the point A is set, acquisition means acquires the address data of nearest VOBU before the VOBU where the point A is set and having V_PCK, if the judgment means judges that V_PCK is not included in the VOBU where the point A is set, and reproduction means reproduces an image of the VOBU based on the address data acquired by the acquisition means, whereby even if the V_PCK is not included in the VOBU where the point A is set, the image based on the address data acquired by the acquisition means of nearest VOBU before the VOBU where the point A is set and having V_PCK can be reproduced by the reproduction means, and in the A-B repeat reproduction, the image to be displayed at the point A can be accurately reproduced, even if there is no image data at the point A.

With the invention of the fourth aspect, in a DVD reproducing apparatus having an A-B repeat function, NV_PCK storage means stores the address data stored in NV_PCK of the VOBU where the point A and the point B are set, judgment means judges whether or not V_PCK is included in the VOBU where the point A is set, when the reproduction occurs up to the point B and returns to the point A, acquisition means acquires the address data of nearest VOBU before the VOBU where the point A is set and having V_PCK, if the judgment means judges that V_PCK is not included in the VOBU where the point A is set, and reproduction means reproduces an image of the VOBU based on the address data acquired by the acquisition means, whereby even if the V_PCK is not included in the VOBU where the point A is set, the image based on the address data acquired by the acquisition means of nearest VOBU before the VOBU where the point A is set and having V_PCK can be reproduced by the reproduction means, and in the A-B repeat reproduction, the image to be displayed at the point A can be reproduced, even if there is no image data at the point A.

Particularly, when the reproduction returns from point B to point A, it is judged whether or not V_PCK is included in the VOBU where the point A is set, whereby it is unnecessary to provide storage means for storing the address data of the nearest VOBU before the VOBU where the point A is set and having V_PCK, and the constitution of the DVD reproducing apparatus is simplified.

DETAILED DESCRIPTION OF THE INVENTION

First Embodiment

The best mode for carrying out the invention will be described below with reference to the drawings.

<Hierarchical Structure of DVD Data>

Figure 1:
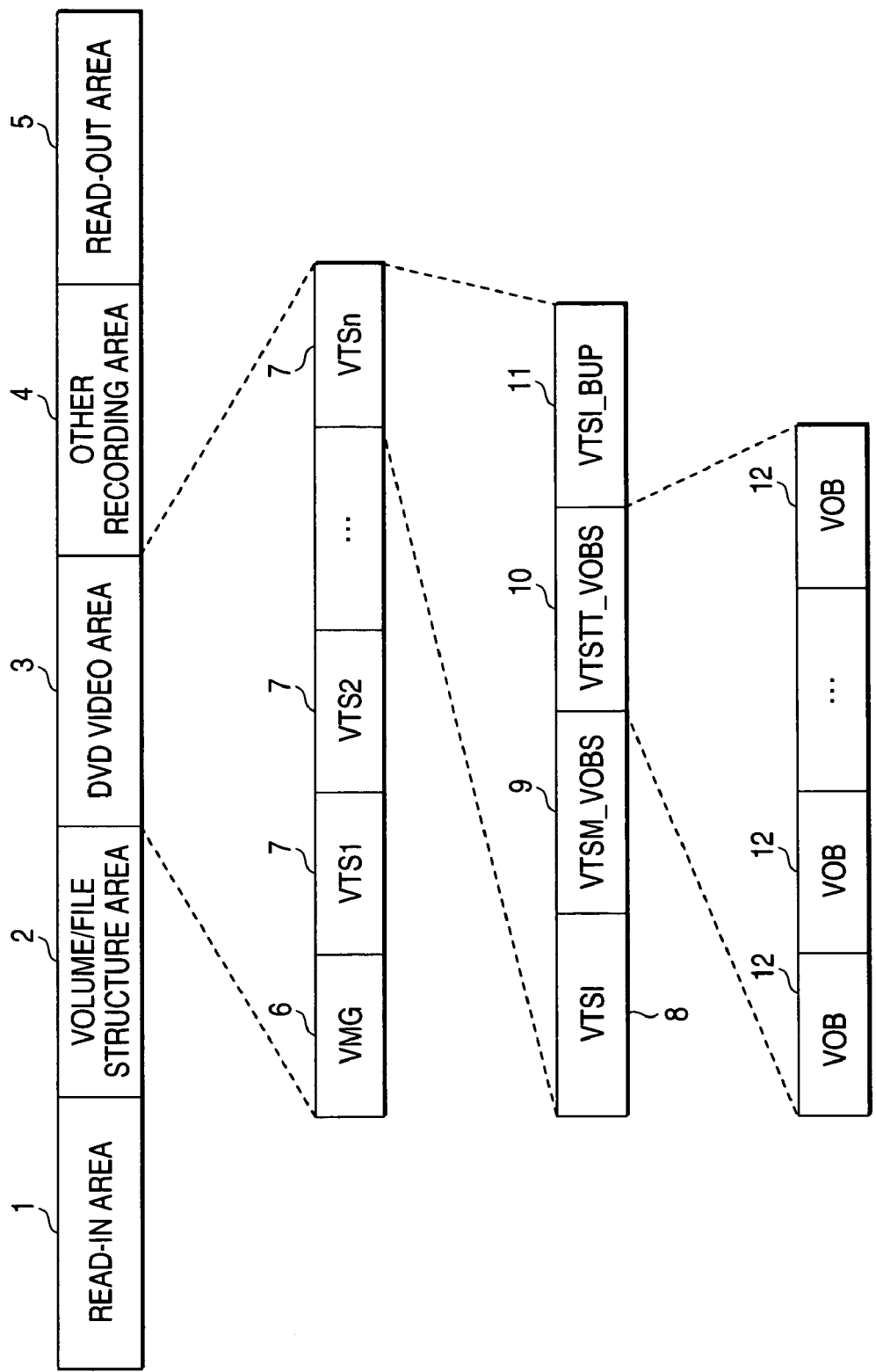
FIG. 1 is a view showing a hierarchical structure of data recorded in the DVD according to a first embodiment.

First of all, a hierarchical structure of data recorded on a DVD will be described below. The hierarchical structure of data recorded in the DVD is defined in conformance to ISO9660 that is one of the standards and a universal disk format (UDF) bridge, for example. And the data recorded in the DVD includes plural areas, such as a read-in area 1, a volume/file structure area 2, a DVD video area 3, other recording area 4, and a read-out area 5, as shown in FIG. 1.

A data recording area is from the read-in area 1 to the read-out area 5, and allocated as a volume space. The volume space may include a space (volume/file structure area 2) for data of volume and file structure, a space (DVD video area 3) for application of DVD standard, and a space (other recording area 4) for other than this standard.

The volume/file structure area 2 corresponds to a management area as defined in the ISO9660 and UDF bridge.

The DVD video area 3 stores data of VMG 6 (video manager) and a number of VTSs 7 (video title set). And the contents of the VMG 6 are stored in a system microcomputer 37 inside the DVD reproducing apparatus, based on a description of the volume/file structure area 2. In the VGM 6, data for managing the VTS 7 is described.

The VTS 7 includes VTS1 (video title set information) 8, VTSM_VOBS (video title set menu video object set) 9, VTSTT_VOBS (video title set title video object set) 10, and VTSI_BUP (video title set information backup) 11.

The VTSTT_VOBS 10 includes plural VOBs (video object) 12.

In the other recording area 4, data available in the VTS 7, or other data irrelevant to the VTS 7 is recorded. This area is not essential.

Figure 2:
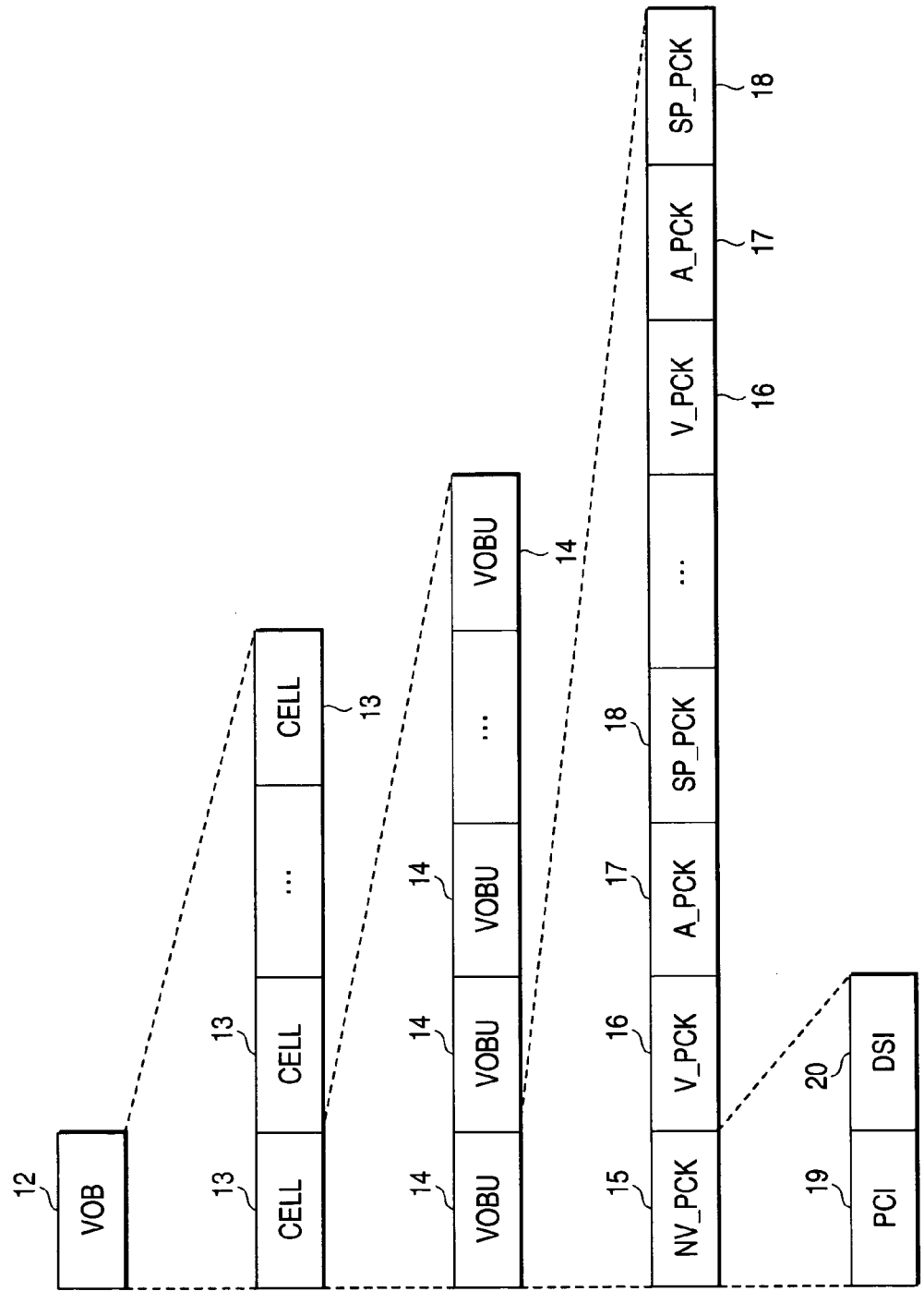
FIG. 2 is a view showing a hierarchical structure of VOB recorded in the DVD according to the first embodiment.

FIG. 2 is a view showing a hierarchical structure of data included in VOB 12. The VOB 12 includes plural Cells 13.

The Cell 13 includes plural VOBUs (video object unit) 14. And the VOBU 14 includes NV_PCK (navigation pack) 15, V_PCK (video pack) 16, A_PCK (audio pack) 17, and SP_PCK (sub picture pack) 18.

Plural V_PCKs 16, A_PCKs 17 and SP_PCKs 18 are included in the VOBU 14. And V_PCK 16, A_PCK 17 and SP_PCK 18 individually store video data, audio data and caption data that are compressed and encoded, respectively.

One NV_PCK 15 is necessarily included in one VOBU 14. Also, the NV_PCK 15 includes PCI (presentation control information) 19 and DSI (data search information) 20, and records the address data of V_PCK 16, A_PCK 17 and SP_PCK 18 and additional information for making the normal reproduction or special reproduction process smoothly.

The DSI 20 stores the address data of V_PCK 16, A_PCK 17 and SP_PCK 18 included in the current VOBU 14, and the address data of NV_PCK 15 of nearest VOBU 14 before the current VOBU 14 and having video data (V_PCK 16). Also, the address of NV_PCK 15 in each VOBU 14 is described in PCI 19.

<Configuration of DVD Reproducing Apparatus>

Figure 3:
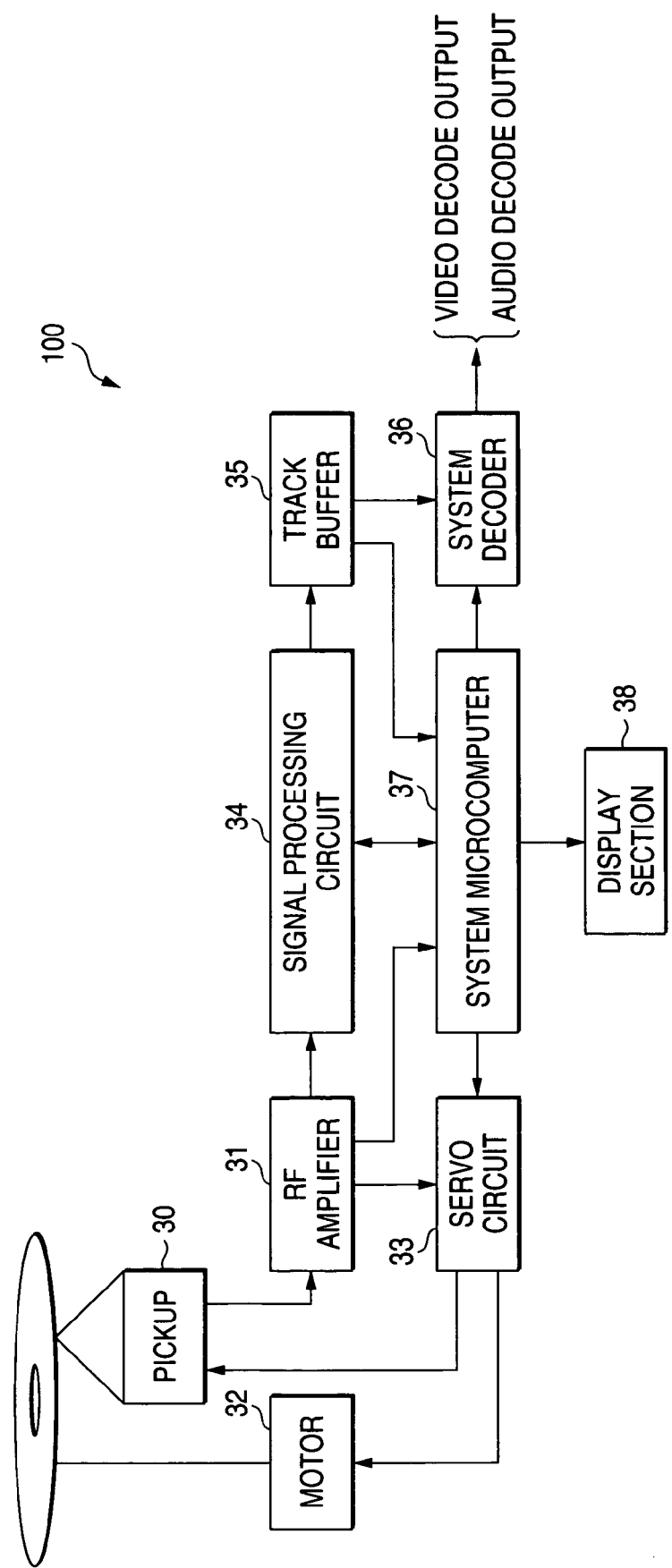
FIG. 3 is a block diagram showing the configuration of a DVD reproducing apparatus according to the first embodiment.

Referring to FIG. 3, the configuration of the DVD reproducing apparatus 100 according to the first embodiment of the invention will be described below.

The DVD reproducing apparatus 100 includes a pickup 30, an RF amplifier 31, a motor 32, a servo circuit 33, a signal processing circuit 34, a track buffer 35, a system decoder 36, a system microcomputer 37 and a display section 38, as shown in FIG. 3.

The pickup 30 radiates a laser beam of predetermined wavelength to the recording face of a disk d, receives its reflected light, and converts the reflected light into an electrical signal (reflected light detection signal). Also, the pickup 30 outputs this reflected light detection signal to the RF amplifier 31. The pickup 30 is supported movably in the radial direction of the disk d along a predetermined guide shaft (not shown) to appropriately read the data of object from the disk d.

The RF amplifier 31 generates an RF signal, a tracking signal and a focus signal from the reflected light detection signal outputted from the pickup 30. Further, the RF amplifier 31 generates a binarized signal by subjecting the RF signal to data slicing. The RF amplifier 31 outputs the generated tracking signal to the servo circuit 33, and outputs the generated binarized signal as a reproduction signal to the signal processing circuit 34.

The motor 32 is a spindle motor for rotating a predetermined turntable that mounts the disk d. The motor 32 rotates the disk d at a constant linear speed under the control of the servo circuit 33.

The servo circuit 33 drives and controls the motor 32 to rotate at a predetermined rotation rate. Also, the servo circuit 33 drives and controls a sled motor (not shown) in accordance with a tracking signal outputted from the RF amplifier 31 to move the pickup 30 in the radial direction of the disk d adequately.

The signal processing circuit 34 demodulates a reproduced signal outputted from the RF amplifier 31, and makes an error correction process. The signal processing circuit 34 sequentially outputs the demodulated data obtained by demodulation to the track buffer 35.

The track buffer 35 is a RAM (Random Access Memory) (not shown) of predetermined capacity to sequentially store the demodulated data outputted from the signal processing circuit 34. The demodulated data stored in the track buffer 35 is successively outputted to the system decoder 36.

The system decoder 36 decodes the demodulated data outputted from the track buffer 35 to generate video data and audio data. The system decoder 36 outputs the generated video data and audio data to a predetermined AV amplifier (not shown).

Figure 4:
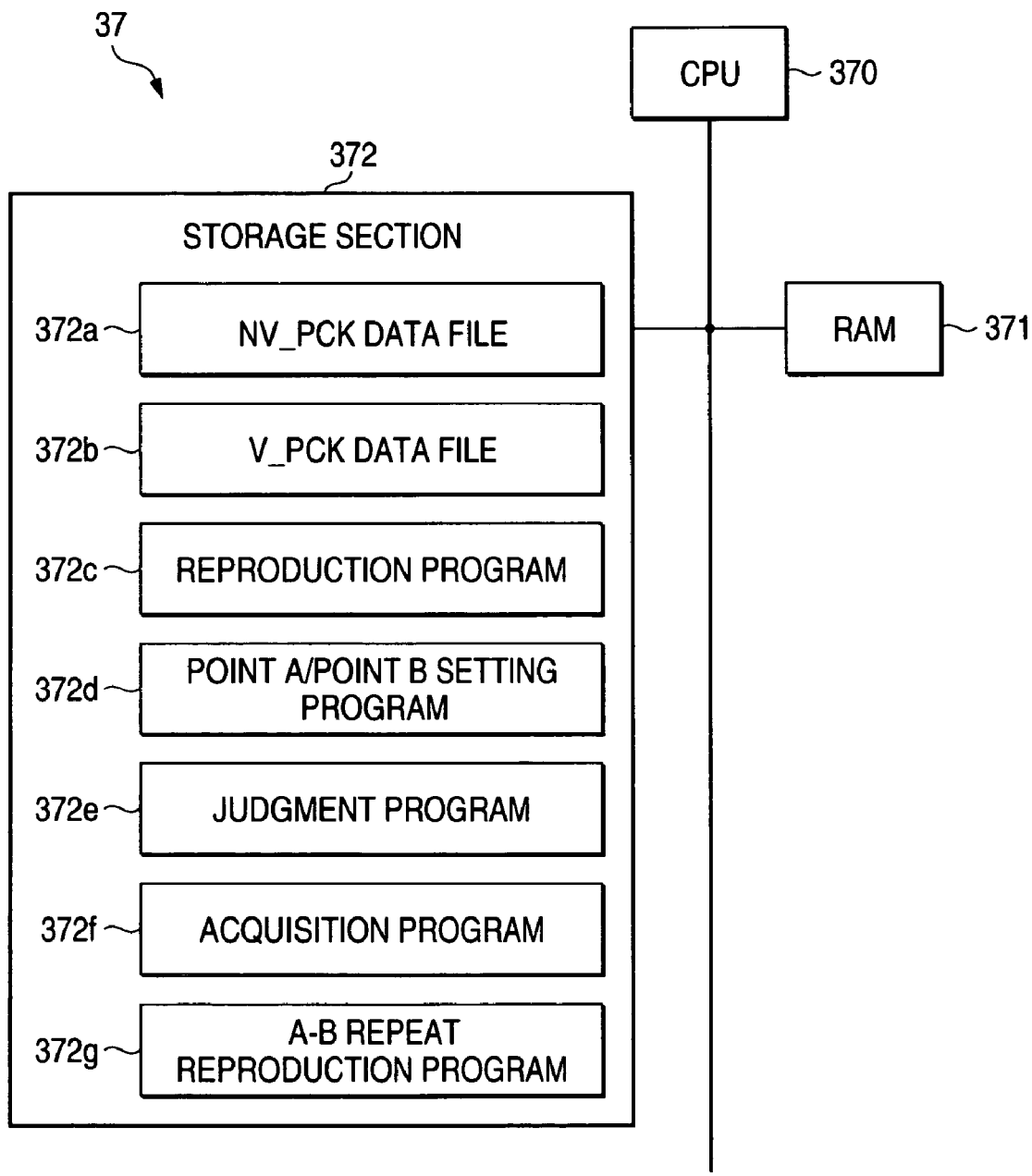
FIG. 4 is a diagram showing the configuration of a system microcomputer according to the first embodiment.

The system microcomputer 37 includes a CPU (Central Processing Unit) 370, a RAM 371, and a storage section 372, as shown in FIG. 4.

The CPU 370 controls the overall DVD reproducing apparatus 100 by reading a processing program stored in the storage section 372, expanding it over the RAM 371, and executing it.

The RAM 371 allows the processing program executed by the CPU 370 to be expanded in a program storage area of the RAM 371, and stores the input data and the processing result obtained by executing the processing program in a work area.

The storage section 372 has a recording medium (not shown) storing beforehand the program or data, in which the recording medium is a semiconductor memory. Also, the storage section 372 stores various kinds of data, various processing programs, and data processed by executing the programs to enable the CPU 370 to implement a function of controlling the overall DVD reproducing apparatus 100. More specifically, the storage section 372 stores an NV_PCK data file 372a as NV_PCK storage means, a V_PCK data file 372b as V_PCK storage means, a reproduction program 372c, a point A/point B setting program 372d, a judgment program 372e, an acquisition program 372f, and an A-B repeat reproduction program 372g, as shown in FIG. 4.

The NV_PCK data file 372a stores the address data in the NV_PCK 15 of the VOBU 14, which are set as point A and point B, in the A-B repeat function of repeating reproduction between point A and point B set by the user (not shown).

The V_PCK data file 372b stores the address data of the nearest VOBU 14 before the VOBU 14 and having the V_PCK 16 by retrieving the DSI 20 of the NV_PCK 15 for the VPBU 14, if V_PCK 16 does not exist in the VOBU 14 where point A is set.

The reproduction program 372c is the program for enabling the CPU 370 to implement a function of reading and reproducing the disk d under the control of the servo circuit 33. More specifically, this program enables the CPU 370 to implement a function of controlling the servo circuit 33 and the pickup 30 to retrieve the NV_PCK 15 that is reproduction management information of the VOBU 14 constituting the Cell 13, acquire the address of object data to be read, search the object data at the acquired address, and read the searched object data from the disk d, controlling the signal control circuit 34 to make the demodulation and error correction process for the read object data (reproduction signal), and store the demodulated data in the track buffer 35, and controlling the system decoder 36 to decode the stored demodulation data and sequentially reproduce the obtained video data and audio data.

The point A/point B setting program 372d is the program for enabling the CPU 370 to implement a function of retrieving the PCI 19 of the NV_PCK 15 for the VOBU 14 where point A or point B is set, extracting the address data of the VOBU 14, and storing it in the NV_PCK data file 372*a* when the user (not shown) depresses a spot setting key (not shown) provided for a remote controller (hereinafter a remote control) (not shown) or a main body of the DVD reproducing apparatus 100.

The judgment program 372*a* is the program for enabling the CPU 370 to implement a function of judging whether or not the V_PCK 16 is included in the VOBU 14 where point A is set. More specifically, this program enables the CPU 370 to implement a function of judging whether or not the address data of V_PCK 16 is described by retrieving the DSI 20 of the NV_PCK 15 for the VOBU 14 where point A is set and judging whether or not V_PCK 16 is included in the VOBU 14. The CPU 370 functions as judgment means by executing the judgment program 372*e*.

The acquisition program 372*f* is the program for enabling the CPU 370 to implement a function of acquiring the address data of the nearest VOBU 14 before the VOBU 14 where point A is set and having V_PCK 16 when it is judged that the V_PCK 16 is not included in the VOBU 14 where point A is set. More specifically, this program enables the CPU 370 to implement a function of acquiring the address data of the nearest VOBU 14 before the VOBU 14 where point A is set and having V_PCK 16 by retrieving the DSI 20 of the NV_PCK 15 for the VOBU 14 and storing it in the V_PCK data file 372*b*, when it is judged that the V_PCK 16 is not included in the VOBU 14 where point A is set. The CPU 370 functions as acquisition means by executing the acquisition program 372*f*.

The A-B repeat reproduction program 372*g* is the program for enabling the CPU 370 to implement a function of repeating reproduction between point A and point B when the user depresses an A-B repeat reproduction key (not shown) of the remote control or the main body of the DVD reproducing apparatus 100. More specifically, this program enables the CPU 370 to implement a function of reproducing the video data and the image data and audio data obtained from the VOBU 14 where point A is set by causing the pickup 30 to search the disk d, based on the address data stored in the NV_PCK data file 372*a* to retrieve the VOBU 14 where point A or point B is set, and retrieve the V_PCK data file 372*b*, and judging whether or not the address data of the nearest VOBU 14 before the VOBU 14 where point A is set and having V_PCK 16 is stored, and if the address data of the nearest VOBU 14 before the VOBU 14 where point A is set and having V_PCK 16 is stored in the V_PCK data file 372*b*, acquiring the V_PCK 16, or video data, and the image data and audio data obtained from the VOBU 14 where point A is set, when the user depresses an A-B repeat reproduction key of the remote control or the main body of the DVD reproducing apparatus 100. The CPU 370 functions as reproduction means by executing the A-B repeat reproduction program 372*g*.

The display section 38 is an LCD (Liquid Crystal Display) panel for displaying the operation status of the DVD reproducing apparatus 100.

<Operation of DVD Reproducing Apparatus>

Figure 5:
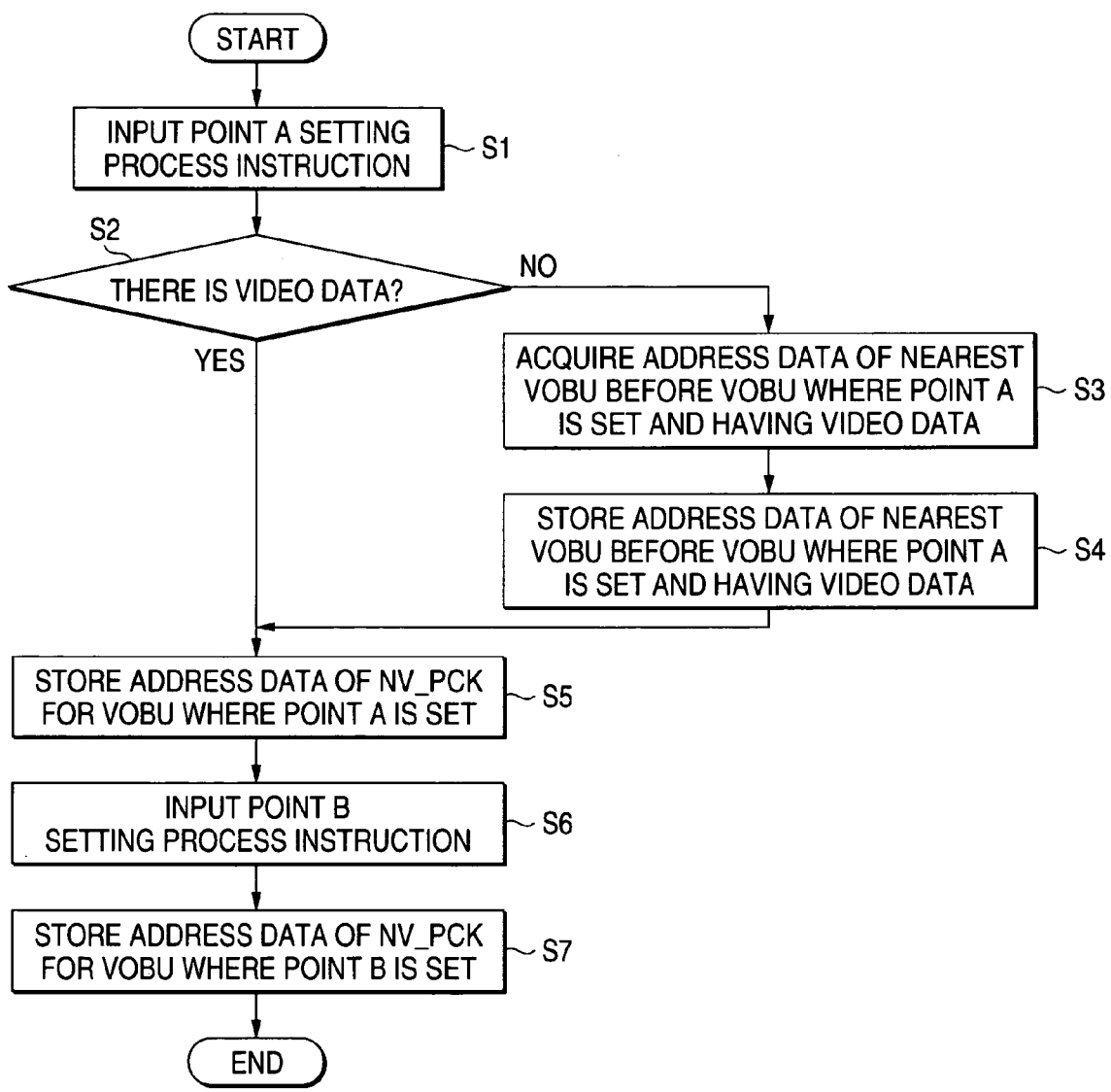
FIG. 5 is a flowchart for explaining the operation of the DVD reproducing apparatus according to the first embodiment.
Figure 6:
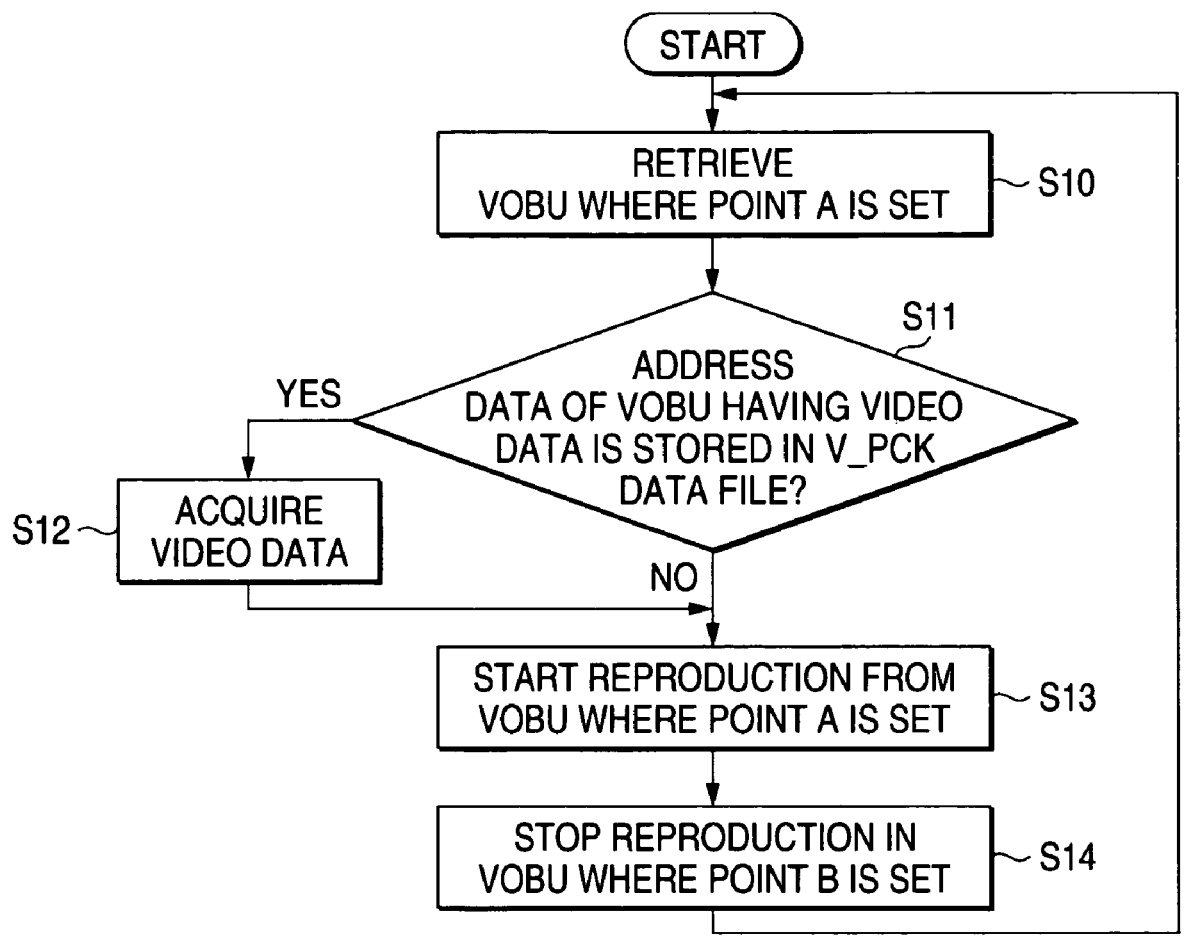
FIG. 6 is a flowchart for explaining the operation of the DVD reproducing apparatus according to the first embodiment.

Referring to the flowcharts of FIGS. 5 and 6, the operation of the DVD reproducing apparatus 100 according to the first embodiment of the invention.

Referring firstly to FIG. 5, a point A and point B setting process will be described below. If the user (not shown) depresses a spot setting key (not shown) during DVD reproduction, the CPU 370 judges that a point A setting process instruction is inputted by sensing the output from the spot setting key (step S1).

The CPU 370 judges whether or not V_PCK 16 is included in the VOBU 14 where point A is set by executing the judgment program 372*e* (step S2).

If it is judged at step S2 that V_PCK 16 is included in the VOBU 14 where point A is set (step S2: Yes), the procedure goes to step S5.

If it is judged at step S2 that V_PCK 16 is not included in the VOBU 14 where point A is set (step S2: No), the CPU 370 acquires the address data of the nearest VOBU 14 before the VOBU 14 where point A is set and having the V_PCK 16 by executing the acquisition program 372*f* and retrieving the DSI 20 of the NV_PCK 15 for the VOBU 14 where point A is set (step S3).

The CPU 370 stores the address data of the nearest VOBU 14 before the VOBU 14 where point A is set and having the V_PCK 16, which is acquired at step S3, in the V_PCL data file 372*b* (step S4).

The CPU 370 executes the point A/point B setting program 372*d* to retrieve the PCI 19 of the NV_PCK 15 for the VOBU 14 where point A is set, extract the address data of the VOBU 14, and store it in the NV_PCK data file 372*a*, thereby completing the point A setting process (step S5).

If the user (not shown) depresses the spot setting key (not shown), the CPU 370 judges that a point B setting process instruction is inputted by sensing the output from the spot setting key provided in the remote control or the main body of the DVD reproducing apparatus 100 (step S6).

The CPU 370 executes the point A/point B setting program 372*d* to retrieve the PCI 19 of the NV_PCK 15 for the VOBU 14 where point B is set, extract the address data of the VOBU 14, and store it in the NV_PCK data file 372*a*, thereby completing the point B setting process (step S7).

Referring to FIG. 6, an A-B repeat reproduction process will be described below.

If the user depresses an A-B repeat reproduction key (not shown) provided in the remote control or the main body of the DVD reproducing apparatus 100, the CPU 370 executes an A-B repeat reproduction program 372*g* to cause the pickup 30 to search the disk d, based on the address data stored in the NV_PCK data file 372*a* in the point A setting process, and retrieve the VOBU 14 where point A is set (step S10).

The CPU 370 judges whether or not the address data of the nearest VOBU 14 before the VOBU 14 where point A is set in the point A setting process and having the V_PCK 16 is stored by retrieving the V_PCK data file 372*b* (step S11).

If it is judged at step S11 that the address data of the nearest VOBU 14 before the VOBU 14 where point A is set and having the V_PCK 16 is not stored (step S11: No), the procedure goes to step S13.

If it is judged at step S11 that the address data of the nearest VOBU 14 before the VOBU 14 where point A is set and having the V_PCK 16 is stored (step S11: Yes), the V_PCK 16, or video data, is acquired by retrieving the nearest VOBU 14 before the VOBU 14 where point A is set and having the V_PCK 16 based on the address data (step S12).

The CPU 370 starts to reproduce the DVD from the position of the VOBU 14 where point A is set, based on the address data of the VOBU 14 where point A is set. At this time, if there is V_PCK 16 (video data) acquired at step S12, the CPU 370 controls the signal control circuit 34 to perform the demodulation/error correction process for the video data and the data of the VOBU 14 where point A is set, and controls the system decoder 36 to decode and reproduce the obtained image data and audio data (step S13).

The CPU 370 controls the pickup 30 to search the disk d, based on the address data stored in the NV_PCK data file 372*a* in the point B setting process, and retrieve the VOBU 14 where point B is set, and stops reproducing the DVD at the position of the VOBU 14 where point B is set (step S14). Then, the procedure returns to step S10 to point A.

In the DVD reproducing apparatus 100 according to the first embodiment as described above, the address data of the NV_PCK 15 of the VOBU 14 where point A and point B are set is stored in the NV_PCK data file 372*a*, when A point is set, the CPU 370 executes the judgment program 372*a* to judge whether or not the V_PCK 16 is not included in the VOBU 14 where point A is set, the CPU 370 executes the acquisition program 372*f* to acquire the address data of the nearest VOBU 14 before the VOBU 14 where point A is set and having the V_PCK 16, the acquired address data being stored in the V_PCK data file 372*b*, and when the reproduction occurs up to point B and returns to point A, the CPU 370 executes the reproduction program 372*c* to reproduce the image based on the address data of the VOBU 14 having the V_PCK 16 stored in the V_PCK data file 372*b*, whereby even if the V_PCK 16 is not included in the VOBU 14 where point A is set, the CPU 370 can reproduce the image based on the address data of the nearest VOBU 14 before the VOBU 14 where point A is set and having the V_PCK 16 stored in the V_PCK data file 372*b* by executing the reproduction program 372*c*, and the image to be displayed at point A can be accurately reproduced even if there is no image data at point A in the A-B repeat reproduction.

Particularly, even if V_PCK 16 is not included in the VOBU 14 where point A is set, the address data of the nearest VOBU 14 before the VOBU 14 where point A is set and having the V_PCK 16 is already stored in the V_PCK data file 372*b*, whereby when returning from point B to point A, the image based on the address data is reproduced promptly.

Second Embodiment

A DVD reproducing apparatus 200 according to the second embodiment is only different from the DVD reproducing apparatus 100 according to the first embodiment, in that the V_PCK data file 372*b* is not provided. Therefore, the same or like parts are designated by the same reference numerals as the DVD reproducing apparatus of the first embodiment, and the explanation of the same parts is not omitted here.

Figure 7:
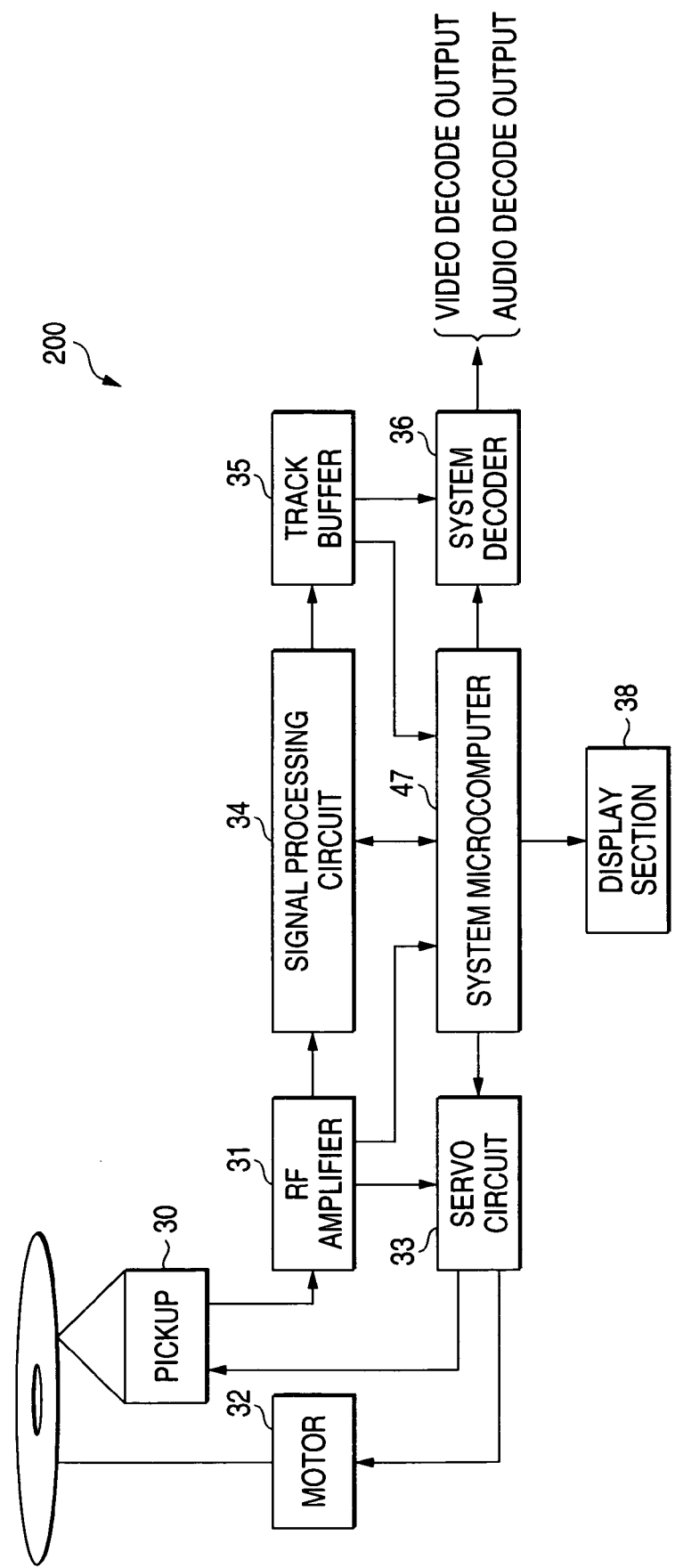
FIG. 7 is a block diagram showing the configuration of a DVD reproducing apparatus according to a second embodiment.

The DVD reproducing apparatus 200 according to the second embodiment includes a pickup 30, an RF amplifier 31, a motor 32, a servo circuit 33, a signal processing circuit 34, a track buffer 35, a system decoder 36, a system microcomputer 37 and a display section 38, as shown in FIG. 7.

Figure 8:
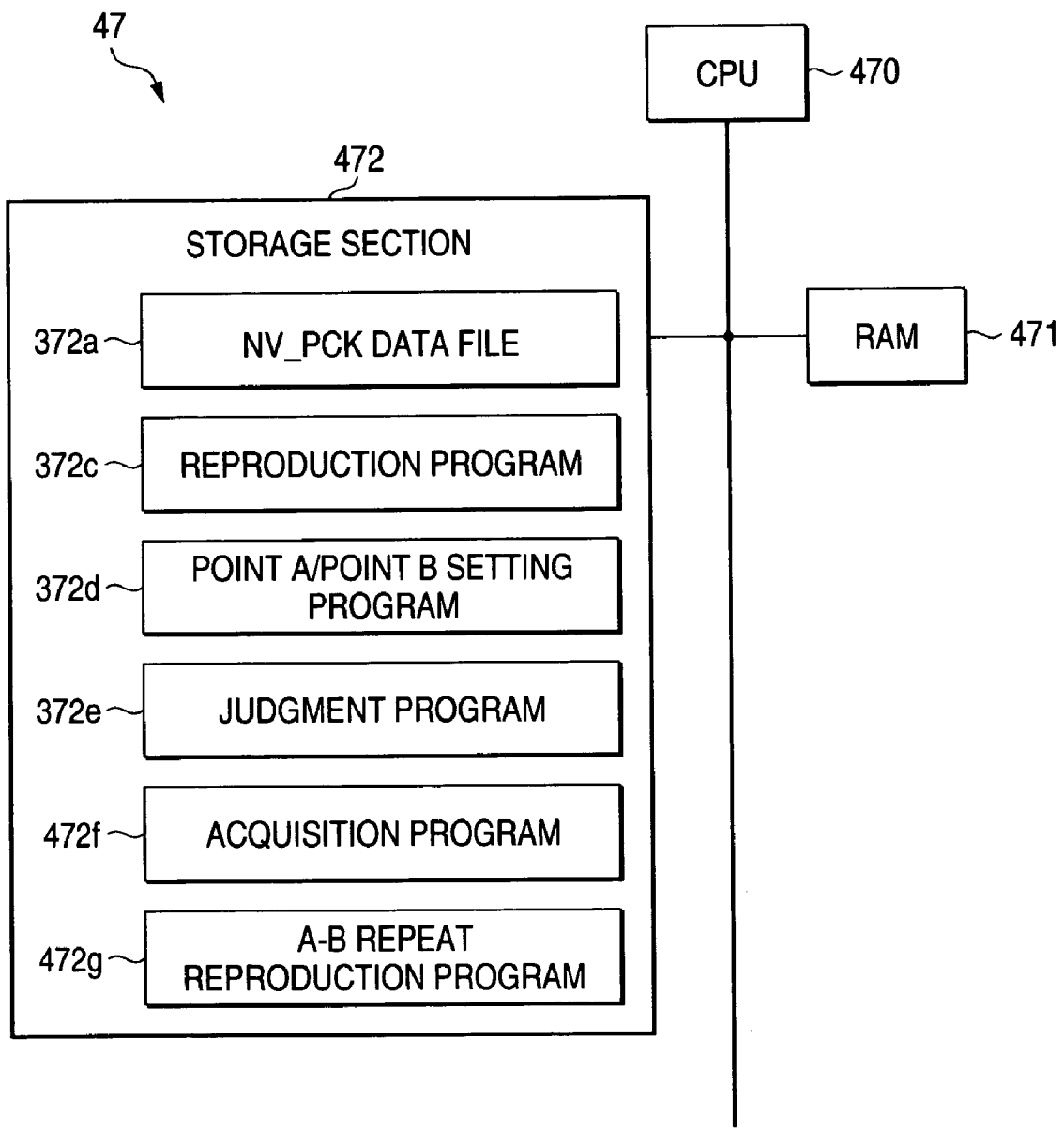
FIG. 8 is a diagram showing the configuration of a system microcomputer according to the second embodiment.

The system microcomputer 47 of the second embodiment includes a CPU (Central Processing Unit) 470, a RAM 471, and a storage section 472, as shown in FIG. 8.

The storage section 472 has a recording medium (not shown) storing beforehand the program or data, in which the recording medium is a semiconductor memory. Also, the storage section 472 stores various kinds of data, various processing programs, and data processed by executing the programs to enable the CPU 470 to implement a function of controlling the overall DVD reproducing apparatus 200. More specifically, the storage section 472 stores an NV_PCK data file 372*a* as NV_PCK storage means, a reproduction program 372*c*, a point A/point B setting program 372*d*, a judgment program 372*e*, an acquisition program 472*f*, and an A-B repeat reproduction program 472*g*, as shown in FIG. 8.

The acquisition program 472*f* of the second embodiment is the program of enabling the CPU 470 to implement a function of acquiring the address data of the nearest VOBU 14 before the VOBU 14 where point A is set and having V_PCK 16 if it is judged that the V_PCK 16 is not included in the VOBU 14 where point A is set. More specifically, this program enables the CPU 470 to implement a function of acquiring the address data of the nearest VOBU 14 before the VOBU 14 where point A is set and having V_PCK 16 by retrieving the DSI 20 of the NV_PCK 15 for the VOBU 14, if it is judged that the V_PCK 16 is not included in the VOBU 14 where point A is set. The CPU 470 functions as acquisition means by executing the acquisition program 472*f*.

The A-B repeat reproduction program 472*g* of the second embodiment is the program for enabling the CPU 470 to implement a function of repeating reproduction between point A and point B when the user depresses an A-B repeat reproduction key (not shown) of the remote control (not shown) or the main body of the DVD reproducing apparatus 200. More specifically, this program enables the CPU 470 to implement a function of reproducing the video data and the image data and audio data obtained from the VOBU 14 where point A is set by causing the pickup 30 to search the disk d, based on the address data stored in the NV_PCK data file 372*a*, to retrieve the VOBU 14 where point A or point B is set, and judging that the V_PCK 16 is not included in the VOBU 14 where point A is set by executing the judgment program 372*e* and acquiring the address data of the nearest VOBU 14 before the VOBU 14 where point A is set and having the V_PCK 16 by executing the acquisition program 472*f* to acquire the V_PCK 16, or video data, when the user depresses an A-B repeat reproduction key of the remote control or the main body of the DVD reproducing apparatus 200. The CPU 470 functions as reproduction means by executing the A-B repeat reproduction program 472*g*.

<Operation of DVD Reproducing Apparatus>

Referring to the flowcharts of FIGS. 9 and 10, the operation of the DVD reproducing apparatus 200 according to the second embodiment of the invention will be described below.

Figure 9:
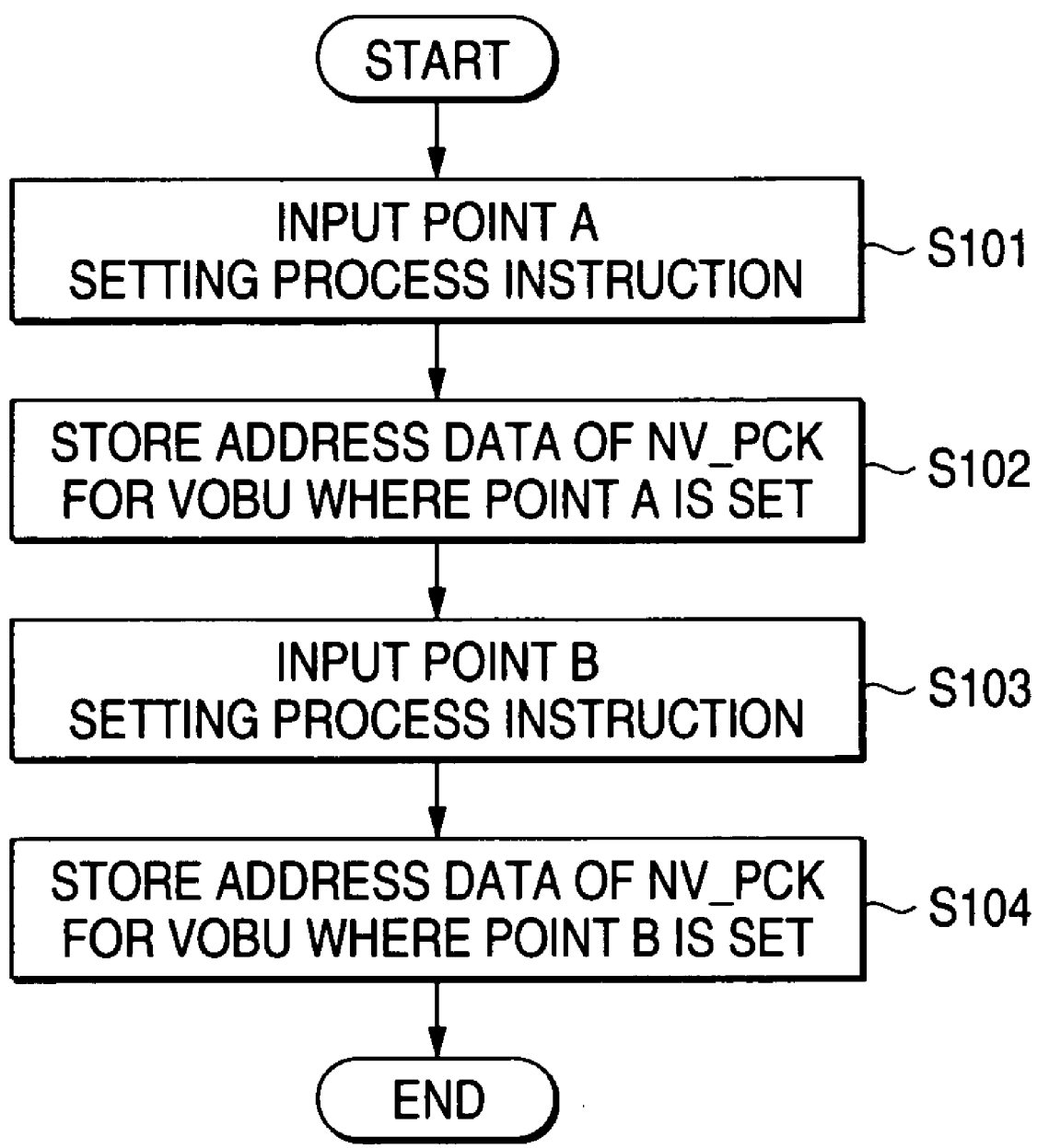
FIG. 9 is a flowchart for explaining the operation of the DVD reproducing apparatus according to the second embodiment.

Referring firstly to FIG. 9, a point A and point B setting process will be described below. If the user (not shown) depresses a spot setting key (not shown) during DVD reproduction, the CPU 470 judges that a point A setting process instruction is inputted by sensing the output from the spot setting key (step S101).

The CPU 470 executes the point A/point B setting program 372*d* to retrieve the PCI 19 of the NV_PCK 15 for the VOBU 14 where point A is set, extract the address data of the VOBU 14, and store it in the NV_PCK data file 372*a*, thereby completing the point A setting process (step S102).

If the user (not shown) depresses the spot setting key (not shown), the CPU 470 judges that a point B setting process instruction is inputted by sensing the output from the spot setting key provided in the remote control or the main body of the DVD reproducing apparatus 200 (step S103).

The CPU 470 executes the point A/point B setting program 372*d* to retrieve the PCI 19 of the NV_PCK 15 for the VOBU 14 where point B is set, extract the address data of the VOBU 14, and store it in the NV_PCK data file 372*a*, thereby completing the point B setting process (step S104).

Figure 10:
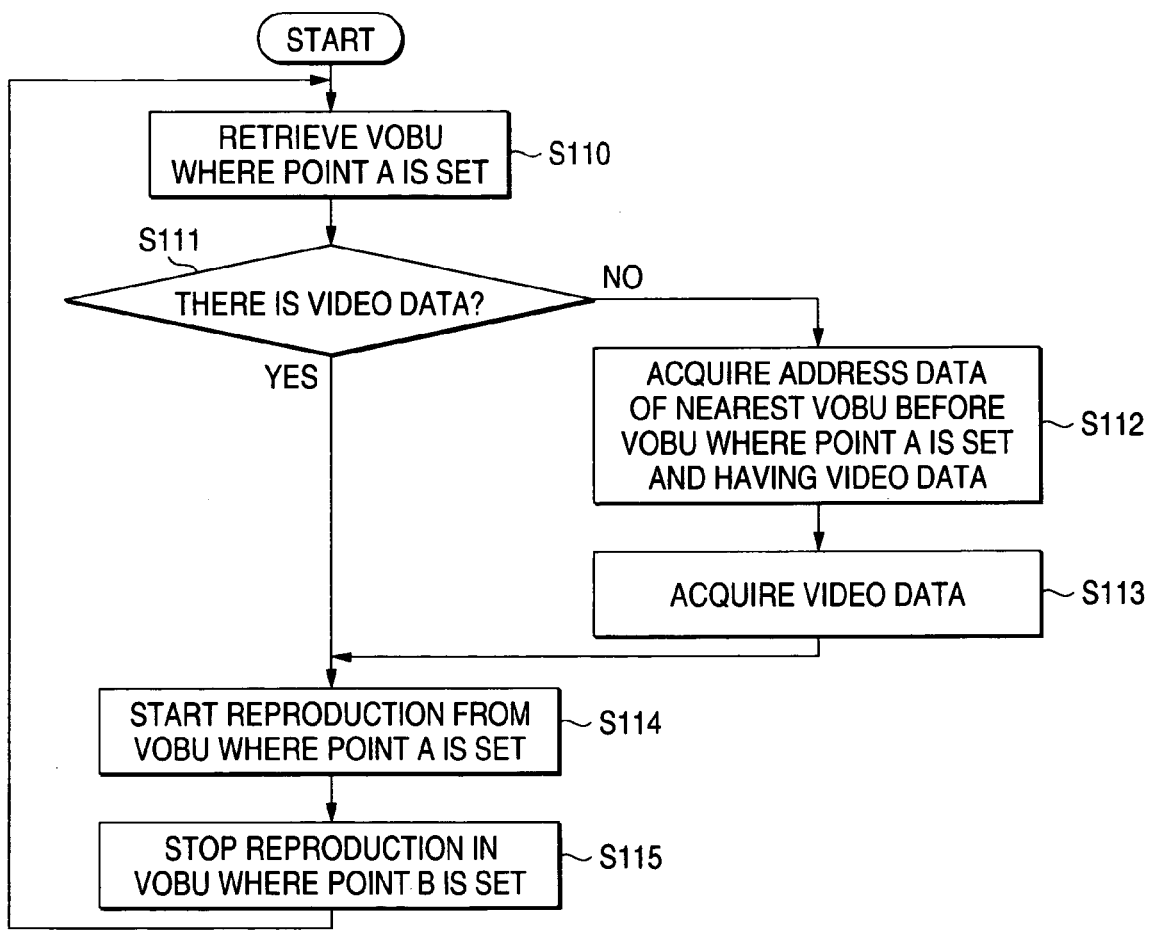
FIG. 10 is a flowchart for explaining the operation of the DVD reproducing apparatus according to the second embodiment.

Referring to FIG. 10, an A-B repeat reproduction process will be described below.

If the user depresses an A-B repeat reproduction key (not shown) provided in the remote control or the main body of the DVD reproducing apparatus 200, the CPU 470 executes an A-B repeat reproduction program 472*g* to cause the pickup 30 to search the disk d and retrieve the VOBU 14 where point A is set, based on the address data stored in the NV_PCK data file 372*a* in the point A setting process (step S110).

The CPU 470 judges whether or not the V_PCK 16 is included in the VOBU 14 where point A is set by executing the judgment program 372*e* (step S111).

If it is judged at step S111 that the V_PCK 16 is included in the VOBU 14 where point A is set (step S111: Yes), the procedure goes to step S114.

If it is judged at step S111 that the V_PCK 16 is not included in the VOBU 14 where point A is set (step S111: No), the CPU 470 executes the acquisition program 472f to retrieve the DSI 20 of the NV_PCK 15 for the VOBU 14 where point A is set and acquire the address data of the nearest VOBU 14 before the VOBU 14 where point A is set and having the V_PCK 16 (step S112).

The CPU 470 retrieves the nearest VOBU 14 before the VOBU 14 where point A is set and having the V_PCK 16, based on the address data acquired at S112, and acquires the V_PCK 16, or video data (step S113).

The CPU 470 start to reproduce the DVD from the position of the VPBU 14 where point A is set, based on the address data of the VOBU 14 where point A is set. At this time, if there is V_PCK 16 (video data) acquired at step S113, the CPU 470 controls the signal control circuit 34 to make the demodulation and error correction process for the video data and the data of the VOBU 14 where point A is set, and controls the system decoder 36 to decode and reproduce the obtained image data and audio data (step S114).

The CPU 470 controls the pickup 30 to search the disk d and retrieve the VOBU 14 where point B is set, based on the address data stored in the NV_PCK data file 372a in the point B setting process, and stops reproducing the DVD at the position of the VOBU 14 where point B is set (step S115). Then, the procedure returns to step S110 to point A.

In the DVD reproducing apparatus 200 according to the second embodiment as described above, the address data of the NV_PCK 15 of the VOBU 14 where point A and point B are set is stored in the NV_PCK data file 372a, the CPU 470 executes the judgment program 372a to judge whether or not the V_PCK 16 is included in the VOBU 14 where point A is set, when the reproduction occurs up to point B and returns to point A, and if it is judged that the V_PCK 16 is not included in the VOBU 14 where point A is set, the CPU 470 executes the acquisition program 472f to acquire the address data of the nearest VOBU 14 before the VOBU 14 where point A is set and having the V_PCK 16, and the CPU 470 executes the reproduction program 372c to reproduce the image of the VOBU 14 based on the acquired address data, whereby even if the V_PCK 16 is not included in the VOBU 14 where point A is set, the CPU 470 can reproduce the image based on the address data of the nearest VOBU 14 before the VOBU 14 where point A is set and having the V_PCK 16, which is acquired by executing the acquisition program 472f, by executing the reproduction program 372c, and the image to be displayed at point A can be reproduced even if there is no image data at point A in the A-B repeat reproduction.

Particularly, since it is judged whether or not the V_PCK 16 is included in the VOBU 14 where point A is set when the reproduction returns from point B to point A, it is unnecessary to provide storage means for storing the address data of the nearest VOBU 14 before the VOBU 14 where point A is set and having the V_PCK 16, whereby the constitution of the DVD reproducing apparatus 200 is simplified.

In the embodiments of the invention, it is not necessary that the point B is always set, but a marker search function of performing reproduction from a marker point by setting the point A as the marker point without setting the point B may be provided, the same effect of the invention is achieved. That is, the CPU judges whether or not the V_PCK is included in the VOBU where the marker point is set, and if it is judged that the V_PCK is not included in the VOBU where the marker point is set, the CPU acquires the address data of the nearest VOBU before the VOBU where the marker point is set and having the V_PCK, and reproduces the image of VOBU, based on the acquired address data, whereby even if the V_PCK is not included in the VOBU where the marker point is set, the CPU can reproduce the image based on the address data of the nearest VOBU before the VOBU where the marker point is set and having the V_PCK, acquired by the CPU, and the image to be displayed at the marker point can be reproduced even if there is no image data at the marker point in the reproduction with the marker search function.

What is claimed is:

1. A DVD reproducing apparatus comprising:
    a reproducer, operable to reproduce data recorded on a DVD and including a plurality of VOBUs;
    a storage; and
    a controller, configured to:
        judge whether a V_PCK is included in a first one of the VOBUs corresponding to a first time point when the DVD reproduction apparatus receives an instruction for designating the first time point;
        identify a second one of the VOBUs including a V_PCK and corresponding to a second time point earlier than the first time point but closest to the first time point, in a case where it is judged that the first one of the VOBUs includes no V_PCK;
        store first address data recorded in an NV_PCK of the second one of the VOBUs into the storage;
        store, into the storage, second address data recorded in an NV_PCK of a third one of the VOBUs corresponding to a third time point later than the first time point, when the DVD reproduction apparatus receives an instruction for designating the third time point; and
        cause the reproducer to repeat reproduction of the data between the second time point and the third time point, based on the first address data and the second address data stored in the storage.

2. A DVD reproducing apparatus comprising:
    a reproducer, operable to reproduce data recorded on a DVD and including a plurality of VOBUs; and
    a controller, configured to:
        judge whether a V_PCK is included in a first one of the VOBUs corresponding to a first time point when the DVD reproduction apparatus receives an instruction for designating the first time point;
        identify a second one of the VOBUs including a V_PCK and corresponding to a second time point earlier than the first time point but closest to the first time point, in case where it is judged that the first one of the VOBUs includes no V_PCK;
        store address data recorded in an NV_PCK of the second one of the VOBUs into the storage; and
        cause the reproducer to repeat reproduction of the data from the second time point based on the address data stored in the storage, when the DVD reproduction apparatus receives an instruction for restarting reproduction from the first time point.

3. A DVD reproducing apparatus comprising:
    a reproducer, operable to reproduce data recorded on a DVD and including a plurality of VOBUs; and
    a controller, configured to:
        judge whether a V_PCK is included in a first one of the VOBUs corresponding to a first time point when the DVD reproduction apparatus receives an instruction for designating the first time point;
        identify a second one of the VOBUs including a V_PCK and corresponding to a second time point earlier than the first time point but closest to the first time point, in case where it is judged that the first one of the VOBUs includes no V_PCK;

acquire address data recorded in an NV_PCK of the second one of the VOBUs into the storage; and cause the reproducer to repeat reproduction of the data between the second time point and a third time point later than the first time point based on the acquired address data.

4. A DVD reproducing apparatus comprising:

a reproducer, operable to reproduce data recorded on a DVD and including a plurality of VOBUs; and a controller, configured to:

fudge whether a V_PCK is included in a first one of the VOBUs corresponding to a first time point when reproduction of the data returns to the first time point from a second time point later than the first time point;

identify a second one of the VOBUs including a V_PCK and corresponding to a third time point earlier than the first time point but closest to the first time point, in a case where it is judged that the first one of the VOBUs includes no V_PCK;

acquire address data recorded in an NV_PCK of the second one of the VOBUs into the storage; and cause the reproducer to repeat reproduction of the data between the third time point and a second time point, based on the acquired address data.

* * * * *